Jan. 19, 1965    E. P. TOMASZEK    3,165,937
CONSTANT SPEED TOROIDAL DRIVE
Filed Aug. 31, 1962    4 Sheets-Sheet 1

INVENTOR.
EDWARD P. TOMASZEK
BY
ATTORNEYS.

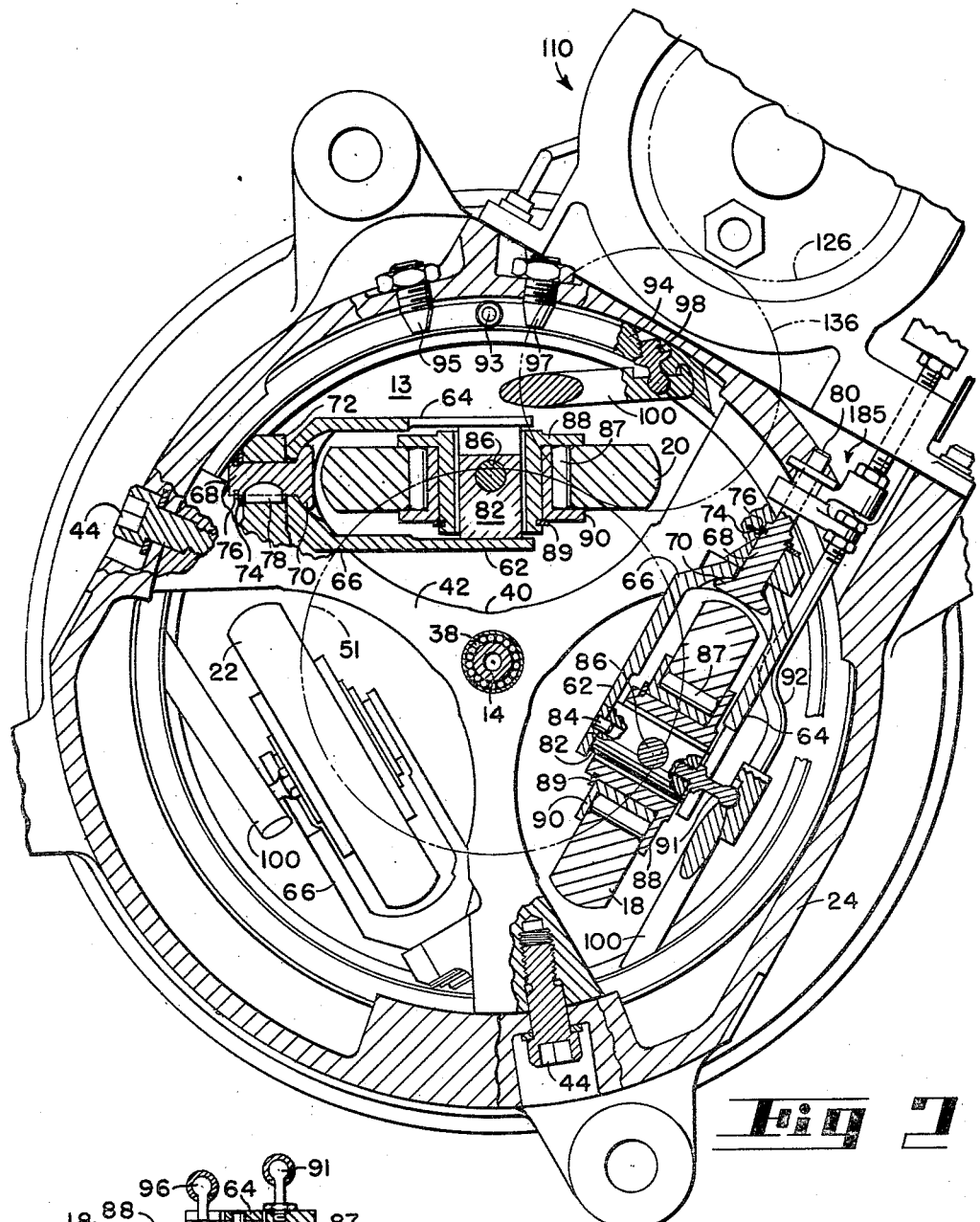

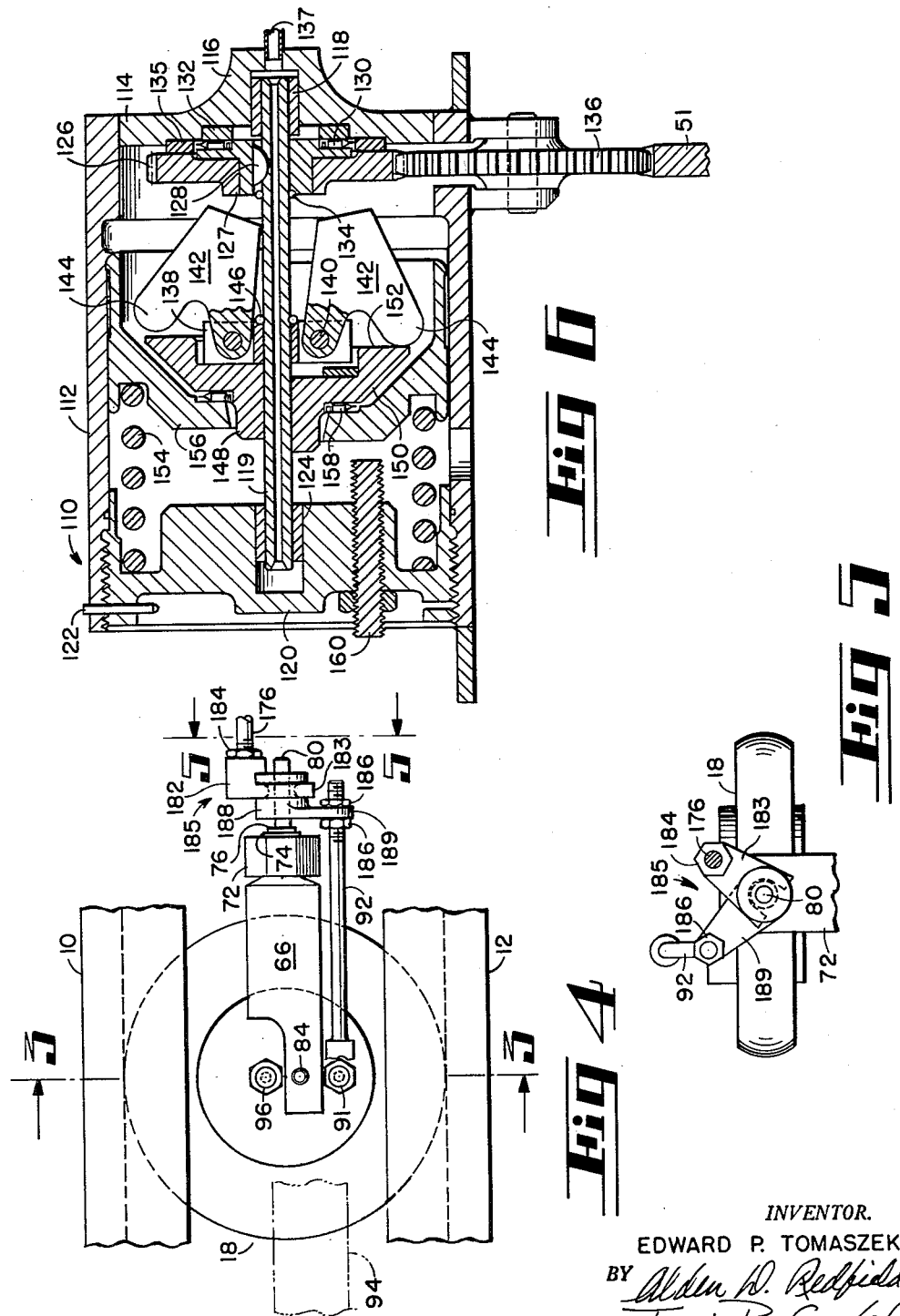

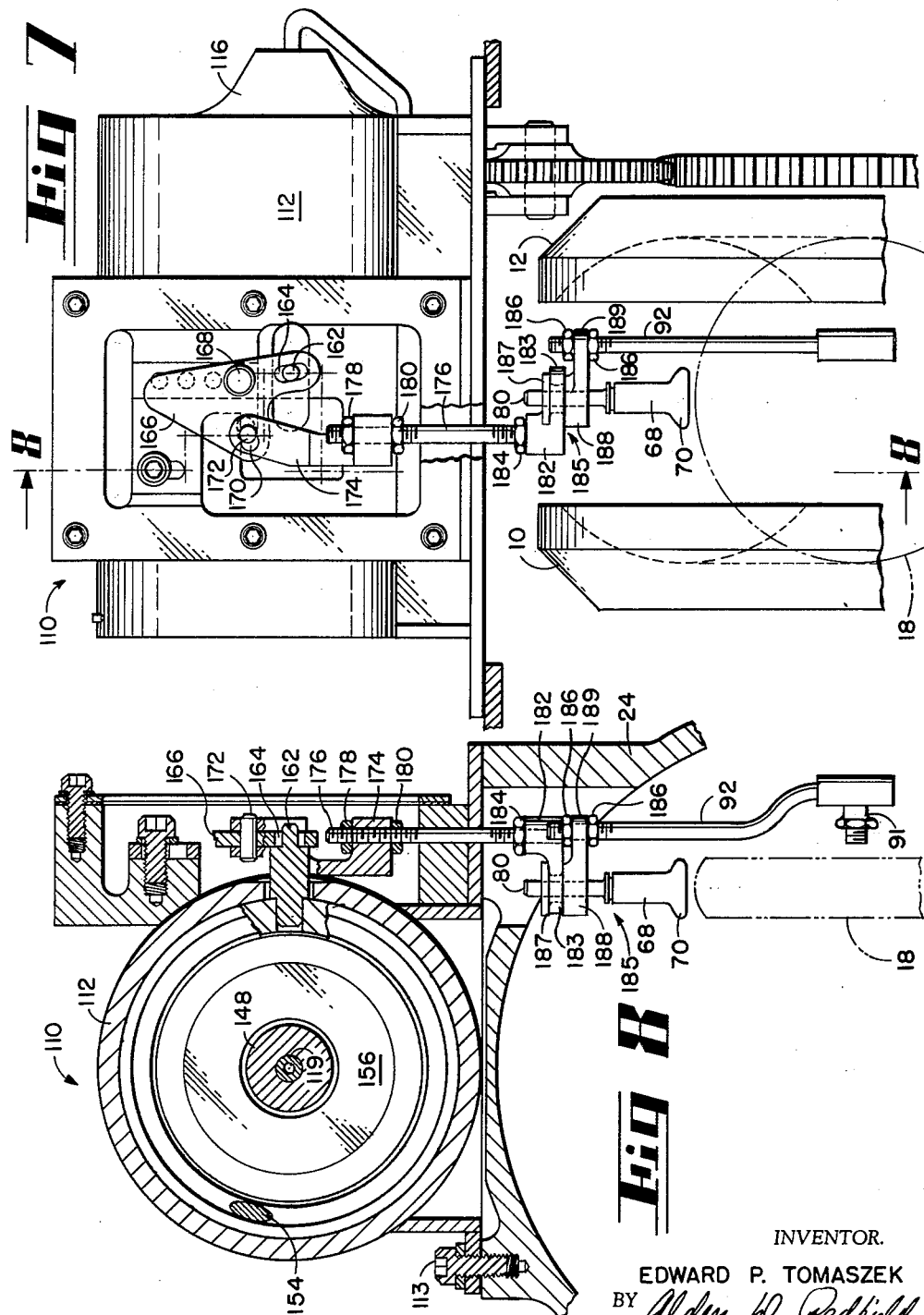

United States Patent Office 3,165,937
Patented Jan. 19, 1965

3,165,937
CONSTANT SPEED TOROIDAL DRIVE
Edward P. Tomaszek, Shelton, Conn., assignor to Avco Corporation, Stratford, Conn., a corporation of Delaware
Filed Aug. 31, 1962, Ser. No. 220,683
16 Claims. (Cl. 74—198.5)

This invention relates generally to constant speed drives capable of precisely maintaining constant output speeds over wide ranges of variations of input speeds, and more particularly to toroidal type friction drives in which the rollers are automatically positioned in accordance with output speed changes.

In toroidal disk transmissions one or more rollers are adjustably positioned in traction between the opposed toroidal races of two coaxial disks, the rollers being arranged for rotation between the races. The input toroid is driven by a prime mover or other source, and a variable ratio driving connection is accomplished between the input and output toroids through the rollers. The ratio of the radial distance of the points of contact of the rollers in the race of the input toroid from the axis of rotation of the disks, to the corresponding radial distance of the points of contact in the race of the output toroid, determines the relative speeds of rotation of the disks. In order to change relative speeds, the points of contact of the rollers are shifted. This invention relates to a unique arrangement for automatically shifting roller position so as to automatically vary the ratio of the input speed to the output in such a manner that the output speed is maintained constant over wide ranges of varying input speeds.

For the purpose of providing a clearer understanding of the precise nature of this invention, certain expressions used in this specification are defined as follows:

"Axis of rotation of the roller" or "roller axis" means that axis about which the roller rotates in rolling in the races of the disks.

"Steering axis of the roller" means that axis joining the instantaneous point of contact of the roller with the races of the disks; it is that axis about which the position of the rollers is altered by a "steering" action.

"Axis of precession of the roller" is that axis about which the rollers are "shifted" to change the speed ratio between the input disk and the output disk.

It is an object of this invention to provide a toroidal drive and a governor therefor for maintaining constant output speeds over a wide range of varying input speeds.

Another object of this invention is to provide a toroidal drive including an input toroid and an output toroid with a plurality of rollers in tractive contact therewith, and to provide a governor, the variations in position of which control the steering action of the rollers.

Another object of this invention is to support a plurality of rollers between the opposed races of a toroidal drive, said disks being interconnected through a control ring, one of said rollers being a master roller, the steering of which is controlled by means of a linkage from a speed-sensing device, the remaining rollers being slaved to the master through the control ring.

Still another object of this invention is to control the steering action in a toroidal drive of a plurality of rollers including a master roller and one or more slave rollers by means of a flyweight governor having an output position proportional to the output speed of the drive, said governor being coupled to the bearings of the master roller through a linkage which is rigid in a direction tending to steer the master roller, but which permits rotation of the master roller on its axis of precession, the slaved rollers being slaved to said master roller.

For other objects and for a clearer understanding of the precise nature of this invention, reference should now be made to the following specification and to the accompanying drawings in which:

FIGURE 2 is a cross-sectional view taken through the line 2—2 in FIGURE 1;

FIGURE 3 is a cross-sectional view of the master roller taken through the line 3—3 in FIGURE 4;

FIGURE 4 is a side elevation of the master roller showing certain of the linkages for controlling the master roller;

FIGURE 5 is a view of the roller taken through line 5—5 in FIGURE 4;

FIGURE 6 is a cross-sectional view taken through the longitudinal axis of the governor;

FIGURE 7 is a side elevation of the governor assembly, certain portions being broken away, and showing the control linkages; and FIGURE 8 is a cross section taken through the line 8—8 in FIGURE 7.

Figure 1:
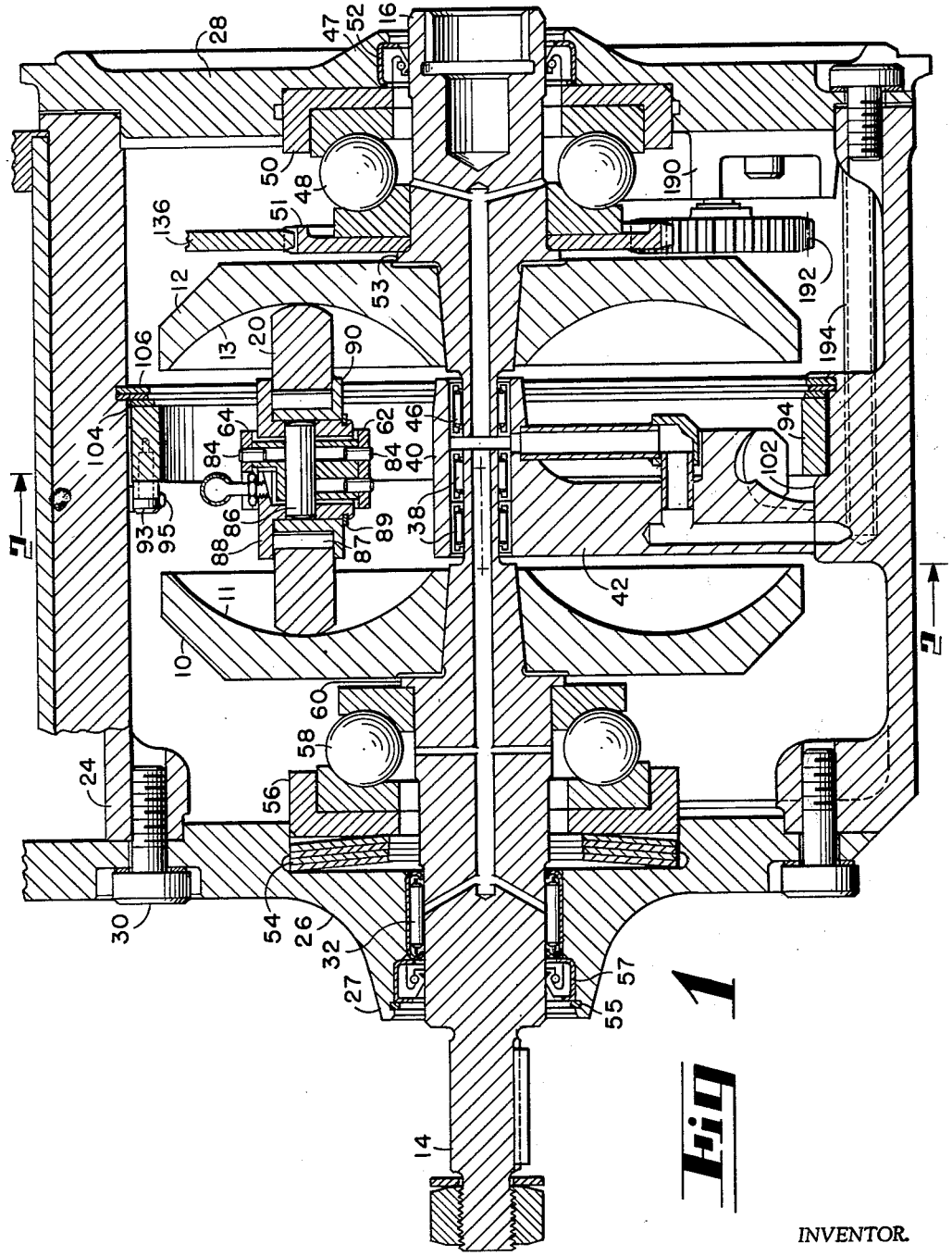
FIGURE 1 is a cross-sectional view of the drive taken through the axis of the toroids.

The toroidal drive utilized in this invention comprises an input toroid disk 10 having a toroidal race 11 and an output toroid disk 12 having a toroidal race 13. The input toroid disk 10 is locked to an input shaft 14, while the output toroid 12 is locked to an output shaft 16. In a manner hereinafter to be explained in detail, a plurality of rollers, including a master roller 18 and two slave rollers 20, 22, are supported in tractive engagement between the opposed races 11 and 13 of the toroids 10 and 12.

The entire assembly is housed within a generally cylindrical housing 24 having a front cover 26 and a rear cover 28, each secured to the housing by means of appropriately spaced screws 30. The hub 27 of the front cover 26 is apertured to accommodate needle bearings 32 for rotatably supporting the input shaft 14. The end of the input shaft within the housing is also rotatably supported by means of needle bearings 38 positioned within the central hub 40 of a three-legged center support 42 appropriately fastened to the central periphery of the housing 24 by means of screws 44.

The hub 40 of the center support 42 also contains needle bearings 46 for supporting the end of the output shaft 16 within the housing. The other end of the shaft 16 extends through an aperture in the hub 47 of the cover 28 and is supported by thrust bearings 48 positioned by means of a thrust bearing adapter 50 in an appropriate recess on the interior of the rear cover 28. A governor drive gear 51 is locked to the output shaft 16 and it, together with the thrust bearings 48, is constrained from axial movement by a peripheral lip 53 on the shaft 16, and the rear cover 28. The output shaft 16 is sealed by means of a seal 52 held in place by the cover 28, while the input shaft is sealed by means of a seal 57 held in place by a spring clip 55.

The toroidal disks 10 and 12 and the rollers 18, 20, and 22 are maintained in compression by means of a Belleville spring washer 54 positioned in a recess in the interior of the front cover 26 and bearing against the thrust bearing adapter 56 for the thrust bearings 58, which in turn are constrained from axial movement by means of a peripheral lip 60 on the shaft 14. Thus, the entire assembly between the bearings 58 and 48 is maintained under compression.

The supports for the rollers 18, 20, and 22 must be capable of permitting rotation of each rollers on each of its three axes; namely, the axis of rotation, the axis of precession, and the steering axis. For this purpose, a yoke 66 having two opposed arms 62 and 64 is provided for supporting each of the rollers 18, 20, and 22. Each yoke 66 is rotatably secured to a leg of the three-legged center support 42 by means of a yoke shaft 68. The yoke shaft 68 extends through an aperture in the yoke 66 and is provided with an enlarged end 70, the surfaces of which mate with the interior surfaces of the yoke, as in a ball and socket arrangement, for permitting rotation of the yoke on the axis of precession. The other end of the shaft 68 extends through a boss 72 on the leg of the center support 42 and is retained thereon by means of a washer 74, a clip 76, and a key 78. The shaft 68 associated with the master roller 18 is provided with an integral extension shaft 80 provided for a purpose hereinafter to be more fully explained.

A roller shaft 82 is fixedly positioned between the ends of the arms 62 and 64 of each yoke 66 by means of dowels 84. The roller shaft is provided with a transverse aperture through which a steering pin 86 extends. It will be seen that the steering axis of the roller is the axis of the steering pin 86.

The rollers 18, 20, and 22 are each supported for rotation on the roller axis by means of needle bearings 87 mounted within a bearing housing 88 and retained by means of an inner race 90, a clip 89 maintaining the parts in assembled condition. The pin 86 extends into the housing 88 and provides the support for the roller and its associated bearings. The roller shaft 82 is mounted concentrically within the bearing housing 88, but there is a small clearance between those elements to permit slight relative rotation on the axis of the steering pin 86. Thus, each roller is free to rotate simultaneously on its axis of rotation on bearings 87; on its steering axis on the steering pin 86; and on its axis of precession by rotation of the yoke 66 on the yoke shaft 68.

The bearing housing 88 of the master roller 18 is connected by means of a ball joint 91 to a master control link 92, the movement of which, as will be seen, serves to rotate the master roller 18 about the axis of steering pin 86. The bearing housing 88 of each roller is additionally connected to a control ring 94 by means of a linkage including the ball joints 96 on the bearing housing 88, the ball joints 98 on the control ring 94, and the slave control links 100, each one of which is provided with an appropriate mating socket.

The control ring 94 is shouldered against appropriately spaced bosses 102 on the inner periphery of the housing 24, and is constrained from axial movement by means of a washer 104 and a snap ring 106. On the other hand, the control ring 94 is free to rotate about the axis of the shafts 14 and 16. A stop pin 93 mounted on the control ring 94 limits the degree of rotation of the ring between the limits established by the screw stops 95 and 97 mounted on the housing 24.

In operation of the device as thus far described, with the master control link 92 in the position shown, the roller 18 will rotate in a fixed circumferential path with respect to each of the toroidal races 11 and 13; that is to say, no steering or precessing motion is imparted to the rollers. However, if the control link 92 is moved in a direction parallel to the axis of precession, the roller will be caused to rotate about the steering pin 86, and the roller points of contact will move outwardly on one toroidal race, and inwardly on the other race. This action causes the roller to precess on the axis of the yoke shaft 68, thus changing the ratio of the input toroid speed to the output toroid speed.

Since the master roller 18 is connected to the control ring 94 by means of the slave control link 100 at the ball joints 96 and 98, rotation of the roller 18 on its steering axis will cause the attendant rotation of the control ring 94. Since control ring 94 is, in turn, connected through the other links 100 to the slave rollers 20 and 22, the slave rollers are also caused to rotate and simultaneously precess with the master roller 18.

As previously indicated, the system provided in accordance with this invention is designed to yield a constant speed of rotation for the output shaft 16 irrespective of variance of speed of the input shaft 14 (within a predetermined range of operation). As will be seen, this invention utilizes the position of the control link 92 as a function of output speed to control steering action and precessing of the rollers to positions which will provide a constant output speed.

For the purpose of controlling the positioning of the master control link 92 to maintain a constant output speed as required, there is provided a governor generally indicated at 110. The governor 110 is supported within a generally cylindrical housing 112 secured to the housing 24 of the drive by means of a plurality of bolts 113. The housing 112 includes an end cover 114 which may be welded or otherwise secured to the cylindrical section. The interior of the central hub 116 of the end cover 114 is recessed to receive a bushing 118 for rotatably supporting one end of the governor shaft 119. The other end of the housing is closed by a cover 120 which is threaded into the housing 112 and locked in position by means of a cotter pin 122. The interior of cover 120 is also recessed to receive a bushing 124 for rotatably supporting the other end of the governor shaft 119.

The governor shaft 119 carries a drive gear 126 positioned on a bushing 127. The bushing 127 is constrained from rotation with respect to the shaft by means of a key 128 and is constrained from axial movement by means of thrust bearings 130 maintained in place by a washer 132 and by means of a retainer ring 134. A felt washer 135 provides a lubricant seal for lubricant supplied to the bearings 130 through an orifice 137 in the hub 116. The gear 126 and the shaft 119 are driven by the governor drive gear 51 positioned on the output shaft 16 of the toroidal drive through an input gear 136 suitably connected to the housing 24.

A yoke 138 carrying two transversely disposed shafts 140 is keyed to the shaft 119. Two flyweights 142, each having a projection 144, are pivotally connected to the yoke by means of shafts 140. One end of the yoke 138 is constrained from axial movement by means of a retaining ring 146. A thrust shaft 148 having an enlarged end 150 providing a thrust plate 152 is slidably positioned on the shaft 119 at the other end of the yoke. The yoke and the thrust shaft are maintained in compression against the retaining ring 146 by means of a spring 154 acting against a plunger-type spring retainer 156.

Thrust bearings 158 are interposed between the spring retainer 156 and the thrust shaft 148 to permit relative rotation of those parts. The degree of compression of the spring 154 may be adjusted by removing the cotter pin 122 and turning the cover 120 in or out. A setscrew 160 is provided for limiting the maximum travel of the thrust shaft 148. Movement of the thrust shaft 148 is transmitted to the control link 92 in the drive by means of a linkage now to be described.

The linkage between the governor and the rollers includes a pin 162 extending radially from the spring retainer 156. The extending end of the pin 162 rides within a slot 164 in one end of a bell crank 166 pivoted on a pin 168. A slot 170 in the other end of the bell crank 166 engages with a pin 172 in the end of a governor link 174. The governor link 174 is provided with an aperture through which one end of a threaded rod 176 extends, and the rod 176 and link 174 are locked together by means of nuts 178 and 180. The other end of the rod 176 is threaded into an aperture in a yoke 182 and locked in position by means of a nut 184. The yoke 182 is provided with two opposing fingers 183 which pivotally engage the reduced diameter mid-portion of a link 185 intermediate the lips 187 and 188. The link 185 is axially movable on the extension 80 of the yoke shaft 68. Thus, while the link 185 is free to pivot with respect to the yoke 182 and the extension 80, the link 185 is axially movable with the yoke 182 along the yoke extension 80. A radial extension 189 from the lip 188 is secured to the control link 92 and is locked in position by means of nuts 186.

As was noted previously, if the control link 92 is in the position shown in FIGURE 2 of the drawings, no roller-steering action results, and the ratio between the input and output speeds remains unchanged. Since the output gear 51 is coupled to the gear 126 in the governor, the governor shaft 119 rotates at a speed proportional to the output shaft speed. If the speed of the governor shaft 119 is sufficiently high, the flyweights 142 rotate radially outwardly causing the flyweight projections 144 to bear against the thrust plate 152. This action causes the thrust shaft 148 to move in opposition to the spring 154 by an amount proportional to the speed of the governor shaft 119.

It is seen, therefore, that the position of the thrust shaft 148 is a function of the angular velocity of the shaft 119 and the output shaft 16. As the thrust shaft 148 and spring retainer 156 are moved axially along the shaft 119, the bell crank 166 is pivoted on the pin 168 by the co-action of the pin 162 within the slot 164. This causes the longitudinal movement of the rod 176 and control link 92 through the connection of the yoke 182 and link 185. This causes the steering action of the roller followed by the precession of the roller on the yoke shaft. It will be noted that the position of the control link 92 is a function of output speed, and hence the amount of steering imparted to each roller 18, 20, and 22 is a function of output speed error. The position of the roller on the contact axis is a function of the position of control ring 94. Because of the connection of the rod 176 and control link 92 through the yoke 182 and link 185, axial motion of the link 92 is permitted, while at the same time the roller is free to precess on the yoke shaft 68.

An oil pump, generally indicated at 190, and driven through a gear 192 coupled to the drive gear 51, is provided for the purpose of supplying lubricant to the various parts of the drive through a plurality of ports 194.

Thus there has been provided a compact, self-contained toroidal drive in which the output speed is maintained constant within very close limits, and in which any error is detected and rapidly integrated out by a steering action of the rollers, the degree of steering being a function of output speed error.

Many modifications and adaptations of this invention will at once become apparent to persons skilled in the art, and it is intended therefore that this invention be limited only by the scope of the appended claims as interpreted in the light of the prior art.

I claim:
1. In a toroidal drive, the combination comprising:
first and second coaxially positioned spaced rotatably supported disks having opposed toroidal races;
a plurality of rollers, one of said rollers being a master roller, the remaining of said rollers being slave rollers;
a mounting for each of said rollers, for supporting each of said rollers in tractive contact between the opposed toroidal races of said disks, each of said mountings including an annular bearing member for rotatably supporting a roller on its roller axis, a steering pin in said annular bearing member, the axis of said pin being positioned on the steering axis of said roller, said annular bearing member being supported by said steering pin, and a yoke for supporting said steering pin, said yoke being rotatable on the axis of precession of said roller, said roller axis, said steering axis, and said axis of precession having normal positions which are mutually perpendicular;
a control ring positioned intermediate said disks and coaxially therewith;
a pivotal linkage between the said bearing member of each of said rollers and said control ring; and
additional means connected to the annular bearing member of said roller for rotating said master roller on its steering axis,
whereby said control ring is rotated on the axis of said disks and said slave rollers are each rotated on said steering axes, and whereby said rollers precess on said axis of precession to new positions between said races until said master roller is rotated on said steering axis to its normal position.

2. The invention as defined in claim 1 wherein said additional means comprises a linkage including a rod having its longitudinal axis lying parallel to the axis of precession, said rod being longitudinally movable with respect to said axis of precession for rotating said master roller on said steering axis, said rod also being revolvable about said axis of precession.

3. The invention as defined in claim 1 wherein said pivotal linkage between the bearing member of each of said rollers and said control ring comprises a rod, one end of which is connected by means of a ball joint connection to said bearing member, the other end of which is connected by a ball joint connection to said control ring.

4. In a toroidal drive, the combination comprising:
first and second coaxially positioned rotatably supported spaced discs having opposed toroidal races;
a plurality of rollers, one of said rollers being a master roller, the remaining of said rollers being slave rollers, each of said rollers having a roller axis, a steering axis, and an axis of precession, the normal position of said axes being mutually perpendicular;
supporting means for supporting each of said rollers in traction between said opposed races, said supporting means permitting rotation of said rollers on each of said axes;
a control ring positioned coaxially with said disks;
means connected to said master roller supporting means for rotating said master roller on its steering axis;
a connection between the supporting means of each of said rollers and said control ring whereby said slave rollers follow said master roller on said steering axes, and whereby each of said rollers rotates on its axis of precession to a new position between said races until said master roller is rotated on said steering axis to its normal position.

5. The invention as defined in claim 4 wherein each of said supporting means comprises a yoke, said yoke being mounted for rotation on said axis of precession and having two opposed spaced arms lying substantially parallel to said axis; a steering pin positioned coaxially on said steering axis and supported from between said opposed arms; an annular bearing member supported from said steering pin, the axis of said bearing member being coincident with said roller axis, a roller being mounted for rotation on said bearing member.

6. The invention as defined in claim 5 wherein said means connected to said master roller for rotating said master roller on its steering axis comprises a rod having its longitudinal axis lying parallel to said axis of precession, said rod being longitudinally movable for rotating said master roller on said steering axis, said rod also being revolvable about said axis of precession.

7. The invention as defined in claim 5 wherein said connection between the bearing member of each of said rollers and said control ring comprises a rod, one end of which is connected by means of a ball joint connection to said annular bearing member, the other end of which is connected by a ball joint connection to said slave ring.

8. The invention as defined in claim 4 wherein said drive is mounted within a sealed housing.

9. The invention as defined in claim 8 wherein a lubricant pump is mounted within said housing and is drivingly connected to one of said disks.

10. In a system for maintaining constant the speed of rotation of an output shaft with widely varying input shaft speeds, a regulated toroidal drive comprising:
an input shaft;
an output shaft coaxial with said input shaft;
a first toroidal disk mounted on said input shaft;
a second toroidal disk mounted on said output shaft, said first and second disks having opposed toroidal races;
a plurality of rollers, one of said rollers being a master roller and the remaining of said rollers being slave rollers slaved to said master roller, each of said rollers having a roller axis, a steering axis, and an axis of precession, the normal positions of said axes being mutually perpendicular;
supporting means for supporting each of said rollers in traction between said opposed races, each of said supporting means permitting the rotation of said roller on each of said axes;
an inertial governor device driven by said output shaft;
a driving connection between said inertial governor device and said master roller for rotating said master roller on said steering axes, said connection maintaining said roller in said normal position at said constant speed, the degree of rotation of said rollers on said steering axes from its normal position being a function of the speed of rotation of said output shaft.

11. In a system for maintaining constant the speed of rotation of an output shaft with widely varying input shaft speeds, a regulated toroidal drive comprising:
an input shaft;
an output shaft coaxial with said input shaft;
a first toroidal disk mounted on said input shaft;
a second toroidal disk mounted on said output shaft, said first and second disks having opposed toroidal races;
a plurality of rollers, one of said rollers being a master roller and the remaining of said rollers being slave rollers, each of said rollers having a roller axis, a steering axis, and an axis of precession, the normal positions of said axes being mutually perpendicular;
supporting means for supporting each of said rollers in traction between said opposed races, each of said supporting means permitting the rotation of said roller on each of said axes;
an inertial governor device driven by said output shaft;
a driving connection between said inertial governor device and said rollers for rotating said rollers on said steering axes, said connection maintaining said rollers in said normal position at said constant speed, the degree of rotation of said rollers on said steering axes from its normal position being a function of the speed of rotation of said output shaft, said driving connection comprising:
a linkage including a rod positioned substantially parallel to said axis of precession connected between said device and said master roller, said rod being longitudinally movable parallel to said axis to rotate said roller on said steering axis, said rod also being revolvable about said axis to simultaneously permit rotation of said roller on said axis of precession;
a control ring positioned coaxially with said input and output shafts;
a pivotal driving connection between said master roller and said control ring, and a driving connection between said control ring and each of said slave rollers.

12. In a system for maintaining constant the speed of rotation of an output shaft with widely varying input shaft speeds, a regulated toroidal drive comprising:
an input shaft;
an output shaft coaxial with said input shaft;
a first toroidal disk mounted on said input shaft;
a second toroidal disk mounted on said output shaft, said first and second disks having opposed toroidal races;
a roller axis, a steering axis, and an axis of precession,
a plurality of rollers, each of said rollers having the normal positions of said axes being mutually perpendicular;
supporting means for supporting each of said rollers in traction between said opposed races, each of said supporting means permitting the rotation of said roller on each of said axes, each of said supporting means comprising a yoke, said yoke mounted for rotation on said axis of precession and having two opposed spaced arms lying substantially parallel to said axis of precession, a steering pin positioned on said steering axis and supported from between said opposed arms, an annular bearing member supported from said steering pin, the axis of said bearing member being coincident with said roller axis, a roller being mounted for rotation on said bearing member;
an inertial governor device driven by said output shaft;
a driving connection between said inertial governor device and said rollers for rotating said rollers on said steering axes, said connection maintaining said rollers in said normal position at said constant speed, the degree of rotation of said rollers on said steering axes from its normal position being a function of the speed of rotation of said output shaft.

13. The invention as defined in claim 12 wherein said driving connection between said inertial governor device and said rollers comprises a rod connected between said device and one of said rollers, said rod being movable along its longitudinal axis for rotating said roller on its steering axis, said longitudinal axis being positioned parallel to said axis of precession, said rod also being revolvable about said axis of precession.

14. The invention as defined in claim 13, and a slave ring positioned coaxially with said input and output shafts, and a connection between each of said rollers and said slave ring.

15. The invention as defined in claim 14 wherein each connection comprises a rod, one end of which is connected by means of a ball joint connection to said bearing member, the other end of which is connected by said ball joint connection to said slave ring.

16. In a system for maintaining constant the speed of rotation of an output shaft with widely varying input shaft speeds, a regulated toroidal drive comprising:
an input shaft;
an output shaft coaxial with said input shaft;
a first toroidal disk mounted on said input shaft;
a second toroidal disk mounted on said output shaft, said first and second disks having opposed toroidal races;
a plurality of rollers, each of said rollers having a roller axis, a steering axis, and an axis of precession, the normal positions of said axes being mutually perpendicular;
supporting means for supporting each of said rollers in traction between said opposed races, each of said supporting means permitting the rotation of said roller on each of said axes, said disks and rollers being mounted within a sealed housing;

an inertial governor device driven by said output shaft, said inertial governor device being rotatably mounted on the exterior of said housing, the axis of rotation of said device being positioned parallel to the axis of said input and output shafts;

a driving connection between said inertial governor device and said rollers for rotating said rollers on said steering axes, said connection maintaining said rollers in said normal position at said constant speed, the degree of rotation of said rollers on said steering axes from its normal position being a function of the speed of rotation of said output shaft.

References Cited in the file of this patent
UNITED STATES PATENTS

| | | |
|---|---|---|
| 2,003,817 | Almen | June 4, 1935 |
| 2,125,999 | Erban | Aug. 9, 1938 |
| 2,131,158 | Almen et al. | Sept. 27, 1938 |
| 2,962,909 | Jaquith et al. | Dec. 6, 1960 |

UNITED STATES PATENT OFFICE
CERTIFICATE OF CORRECTION

Patent No. 3,165,937  January 19, 1965

Edward P. Tomaszek

It is hereby certified that error appears in the above numbered patent requiring correction and that the said Letters Patent should read as corrected below.

Column 1, line 38, for "in the" read -- on the --; column 6, line 16, before "roller", first occurrence, insert -- master --; column 8, lines 18 and 19, strike out "a roller axis, a steering axis, and an axis of precession, a plurality of rollers, each of said rollers having" and insert instead -- a plurality of rollers, each of said rollers having a roller axis, a steering axis, and an axis of precession, --.

Signed and sealed this 15th day of June 1965.

(SEAL)
Attest:

ERNEST W. SWIDER
Attesting Officer

EDWARD J. BRENNER
Commissioner of Patents